Patented Dec. 12, 1950

2,533,699

UNITED STATES PATENT OFFICE 2,533,699

AMINES CONTAINING THE RING SYSTEM OF LYSERGIC ACID OR DIHYDROLYSERGIC ACID AND A PROCESS OF MAKING SAME

Arthur Stoll, Albert Hofmann, and Franz Troxler, Basel, Switzerland, assignors to Sandoz Limited, Basel, Switzerland No Drawing. Application December 16, 1947, Serial No. 792,096. In Switzerland December 20, 1946

8 Claims. (Cl. 260—285.5)

It has been found that amines possessing either the ring system of lysergic acid and corresponding to the general formula $C_{15}H_{15}N_2.NH_2$, or possessing the ring system of dihydrolysergic acid and corresponding to the general formula

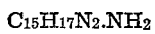

can be obtained by heating the azides of the lysergic or dihydrolysergic acid isomers in aqueous acid solution. In the new compounds, the carboxyl group of the lysergic acid isomers of the formula $C_{15}H_{15}N_2.COOH$, and of the dihydrolysergic acid isomers of the formula

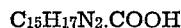

is replaced by a primary amino group.

The nomenclature of these new amino-derivatives can be derived from ergoline, the parent body of this class of compound (W. A. Jacobs and R. G. Gould, J. Biol. Chem. 120, 141 (1937)). In the case of dihydrolysergic acid and its two stereoisomers, dihydro-isolysergic acid (I) and dihydroisolysergic acid (II) (A. Stoll, A. Hofmann and Th. Petrzilka, Helv. Chim. Acta 29, 635 (1946)), which all possess the same formula II, the names 6-methyl-8-carboxyergoline, 6-methyl-8-carboxy-isoergoline (I), and 6-methyl-8-carboxy-isoergoline (II) will be in order. The new derivatives obtainable by replacing the carboxyl group by an amino group are to be named 6-methyl-8-aminoergoline, 6-methyl - 8 - amino-isoergoline (I) and 6-methyl-8-amino-isoergoline (II) respectively (cf. Formula III).

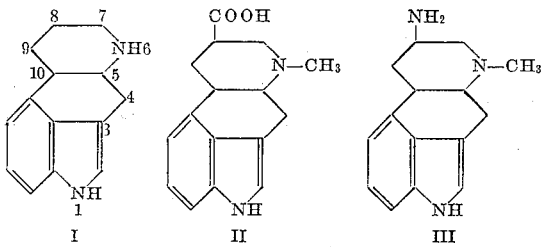

| I | II | III |
|---|---|---|
| Ergoline | Dihydrolysergic acid<br>Dihydro-isolysergic acid (I)<br>Dihydro-isolysergic acid (II) | 6-Methyl-8-amino-ergoline<br>6-Methyl-8-amino-isoergoline (I)<br>6-Methyl-8-amino-isoergoline (II) |

The formulae of the lysergic acid isomers and their corresponding amino degradation products differ from the above-named ergoline derivatives only by an additional carbon-carbon double bond, the position of which is not yet certain (L. C. Craig, Th. Shedlovsky, R. G. Gould, Jr., and W. A. Jacobs, J. Biol. Chem. 125, 289 (1938)). Lysergic acid can therefore also be referred to as 6-methyl-8-carboxy-ergolene and the corresponding amine as 6-methyl-8-amino-ergolene. In the case of isolysergic acid, the designation would be 6-methyl-8-carboxy-isoergolene and for the corresponding amine, 6-methyl-8 - amino-isoergolene.

The process of the present invention consists in adding dilute boiling acid, e. g. 0.2–N. hydrochloric acid, to the crystalline salts of the azides of the lysergic or dihydrolysergic acid isomers and continuing boiling until the evolution of nitrogen and carbon dioxide is complete. This takes 1 to 2 minutes. Alternatively, the acid solution of the azide chlorhydrate, which results from the preparation of the azide from the hydrazide (A. Stoll and A. Hofmann, Helv. Chim. Acta, 26, 953 (1943)), may be heated without previous isolation of the crystalline azide chlorhydrate and boiled until the evolution of gas ceases.

From the degradation, especially of lysergic acid or isolysergic acid, a dark coloured reaction solution results, from which the crude amine may be precipitated by addition of sodium carbonate or alkali, or, as it is usually more advantageous, it may be extracted, after basification, with chloroform or with another suitable solvent.

It is well-known that degradation of lysergic acid or isolysergic acid derivatives always produces a mixture of the two isomeric forms (A. Stoll and A. Hofmann, Helv. Chim. Acta 26, 953 (1943)). Thus, starting from lysergic acid or from isolysergic acid, both isomeric amines are invariably obtained, although there is a strong quantitative predominance of the amine with the lysergic acid structure, i. e. 6-methyl-8-amino-ergolene, in the first case, and of the isomeric 6-methyl-8-amino-isoergolene in the second case. The mixture of the two isomeric amines may be separated by fractional crystallization of the bases or of suitable salts or by means of chromatographic adsorption analysis.

No isomerisation takes place on degradation of the azides of the hydrogenated acids, and the corresponding homogeneous amino-derivatives are always obtained.

The new amines have well-defined crystalline forms and, in a pure state, are almost colorless di-acidic bases. They are slightly to moderately soluble in water, but with inorganic or organic acids they form well-defined crystalline salts which are more or less readily soluble in water depending upon the nature of the acid radical. With ferric chloride in glacial acetic acid and concentrated sulphuric acid they still give Keller's blue colour reaction, this reaction being characteristical for the natural ergot alkaloids.

A few characteristic properties of the new compounds which are valuable therapeutics and intermediates for the preparation of therapeutics are summarised in the following table.

Table

Amino-derivatives obtained by degradation of lysergic acid, isolysergic acid, dihydrolysergic acid, dihydro-isolysergic acid (I) and dyhydro-isolysergic acid (II).

|  | M. P. with decomp. | $[\alpha]_D^{20}$ (pyridine) | Typical crystalline form |
| --- | --- | --- | --- |
|  | °C. | Degrees |  |
| 6-methyl-8-aminoergolene, $C_{15}H_{17}N_3$ | 253 | +96 | From chloroform, in elongated octagonal plates. |
| 6-methyl-8-amino-isoergolene, $C_{15}H_{17}N_3$ | 198 | +249 | From alcohol, in heavy prisms and polyhedra. |
| 6-methyl-8-aminoergoline, $C_{15}H_{19}N_3$ | 243 | −117 | From ethylacetate, in heavy, oblique truncated prisms. |
| 6-methyl-8-amino-isoergoline (I), $C_{15}H_{19}N_3$ | 275–280 | −66 | From methanol, in elongated, hexagonal leaflets. |
| 6-methyl-8-amino-isoergoline (II), $C_{15}H_{19}N_3$ | 203 | +29 | From ethylacetate, in heavy, upright truncated prisms. |

The present invention may now be illustrated, but not limited, by the following examples.

Example 1

Preparation of 6-methyl-8-amino-ergolene:

2.0 parts by weight of freshly prepared, crystalline lysergic acid azide hydrochloride are treated with 100 parts by volume of boiling 0.2-N. hydrochloric acid and gently boiled for a further two minutes. During this time the azide hydrochloride passes into solution with violent gaseous evolution. After cooling, the light brown solution is made alkaline with sodium bicarbonate and extracted with a total volume of 500 parts by vol. of chloroform. The chloroform solution is dried with sodium sulphate and evaporated to dryness, leaving a residue weighing approximately 1.3 parts by weight, corresponding to a yield of 90% of the theoretical.

The mixture of crude amino-derivatives is subjected to chromatographic adsorption analysis. The substance is adsorbed from chloroform solution on 500 parts by weight of aluminium oxide. On developing the chromatogram with chloroform containing 0.5% of alcohol, a few oily impurities first pass into the filtrate. Then follows the main fraction, approximately 0.6 part by weight of pure 6-methyl-8-aminoergolene, $[\alpha]_D^{20} = +94°$ (pyridine). The succeeding fractions exhibit a higher specific rotation (+180° to +220°) and represent a mixture of 6-methyl-8-aminoergolene and its isomer which arises by rearrangement during the course of the degradation. 0.3 part by weight of crude 6-methyl-8-amino-isoergolene is thus obtained.

The 6-methyl-8-aminoergolene is recrystallized from chloroform, giving elongated, octagonal plates containing one molecule of chloroform of crystallization and melting at 246° C. (decomp.). The solvent-free compound melts at 252–253° C. (decomp.). The amine dissolves, at the boiling point, in 50 parts of chloroform, 30 parts of alcohol or 300 parts of benzene. It is moderately soluble in water and readily soluble in dilute aqueous acids.

$[\alpha]_D^{20} = +96°$ (c = 0.5 in pyridine)

Empirical formula $C_{15}H_{17}N_3$:
Required: C = 75.26, H = 7.16, N = 17.57%.
Found: C = 75.37, H = 7.09, N = 17.62%.

Example 2

Preparation of 6-methyl-8-amino-isoergolene:

1.0 part by weight of freshly prepared crystalline isolysergic acid azide hydrochloride is treated with 50 parts by volume of boiling 0.1-N. sulphuric acid. Boiling is continued until the evolution of gas ceases (1–2 minutes). After cooling, the solution is made alkaline with caustic soda and the amine extracted with 1000 parts by volume of benzene. The aqueous phase is extracted twice more using 200 parts by volume of the same solvent each time. The combined benzene extracts are dried with sodium sulphate and evaporated to dryness in vacuo, leaving a residue of 0.6 part by weight of crude amine. The compound is purified by repeated recrystallization from a little absolute alcohol, the accompanying amine of the lysergic acid series remaining in solution.

The pure 6 - methyl - 8 - amino - isoergolene is difficultly soluble in benzene, readily soluble in alcohol, and very readily soluble in methanol. It crystallizes from two latter solvents in clear, heavy prisms and polyhedra, M. P. 198° C. (decomp.).

$[\alpha]_D^{20} = +249°$ (c = 0.5 in pyridine)

Empirical formula $C_{15}H_{17}N_3$:
Required: C = 75.26, H = 7.16, N = 17.57%.
Found: C = 75.48, H = 7.25, N = 17.78%.

Example 3

Preparation of 6-methyl-8-aminoergoline:

2.8 parts by weight of finely powdered dihydrolysergic acid azide hydrochloride (A. Stoll, A. Hofmann and Th. Petrzilka, Helv. Chim. Acta 29, 650 (1946)) are treated with 150 parts by volume of 0.1-N. boiling hydrochloric acid and boiled for a few minutes. On rapidly cooling the solution and making alkaline with caustic soda, the amino-derivative separates out in a crystalline form. It is left to stand at 0° C. for one hour to ensure completion of crystallization, and then filtered off and washed with water. Yield 1.8 parts by weight. A further 0.12 part by weight of amine may be recovered from the aqueous mother liquors by extraction with chloroform. The total yield of 1.92 parts by weight corresponds to 94% of the theoretical.

The 6 - methyl - 8 - aminoergoline crystallizes from ethyl acetate in large, oblique, truncated prisms, free from solvent of crystallization and melting with decomposition at 243° C., it is soluble, at the boiling point in 100 parts of ethyl acetate, 200 parts of benzene, 25 parts of acetone or 10 parts of methanol.

$[\alpha]_D^{20} = -117°$ (c=0.5 in pyridine)

Empirical formula $C_{15}H_{19}N_3$:

Required: C=74.64, H=7.94, N=17.42%.
Found: C=74.85, H=8.02, N=17.23%.

*Example 4*

Preparation of 6-methyl-8-amino-isoergoline (I):

0.33 part by weight of dihydro-isolysergic acid (I) azide hydrochloride (prepared according to A. Stoll, A. Hofmann and Th. Petrzilka, Helv. Chim. Acta 29, 649 (1946)) is treated with 50 parts by volume of boiling 0.5-N. acetic acid and boiled for 2 minutes. The amino-derivative is extracted with chloroform from the cooled reaction mixture after making alkaline with sodium carbonate. The chloroform solution is dried with sodium sulphate and concentrated in vacuo to 5 parts by volume, when 0.2 part by weight of 6-methyl-8-amino-isoergoline (I), crystallizes out in fine clusters of needles, the yield corresponding to 85% of the theoretical. By recrystallization from methanol, the amine is obtained in elongated, hexagonal leaflets. It dissolves, at the boiling point, in 150 parts of methanol or ethanol or in 200 parts of chloroform, and melts indefinitely with decomposition at 275–280° C.

$[\alpha]_D^{20} = -66°$ (c=0.2 in pyridine)

Empirical formula $C_{15}H_{19}N_3$:

Required: C=74.64, H=7.94, N=17.42%.
Found: C=74.66, H=7.90, N=17.55%.

*Example 5*

Preparation of 6-methyl-8-amino-isoergoline (II):

0.765 part by weight of dihydro-isolysergic acid (II) hydrazide is dissolved in 27 parts by volume of 0.1-N. hydrochloric acid, 27 parts by volume of 0.1-N. sodium nitrite solution are added and 16 parts by volume of 0.2-N. hydrochloric acid allowed to run in dropwise over 3 minutes at 0° C. with good stirring. The mixture is left to stand at 0° C. for 2 minutes to allow completion of the azide formation. The solution is then heated rapidly to the boiling point over a naked flame and boiled until the evolution of gas ceases, which takes about 3 minutes. The amine is extracted with chloroform from the cooled solution after making alkaline with caustic soda. After drying the chloroform solution with sodium sulphate and evaporation in vacuo, 0.535 part by weight of crude amine remains, corresponding to a yield of 82% of the theoretical.

On recrystallization of the 6-methyl-8-amino-isoergoline (II) from 10 volumes of ethyl acetate, massive upright truncated prisms are obtained, which melt at 203° C. with decomposition. The amine is soluble at the boiling point in 70 parts of benzene or 100 parts of water. It is very readily soluble in methanol or ethanol.

$[\alpha]_D^{20} = +29°$ (c=0.5 in pyridine)

Empirical formula $C_{15}H_{19}N_3$:

Required: C=74.64, H=7.94, N=17.42%.
Found: C=74.83, H=8.14, N=17.83%.

What we claim is:

1. A process for the manufacture of a heterocyclic amine of the ergolene series, which comprises the step of boiling in a dilute acid aqueous solution an azide of the ergolene series of the formula $C_{15}H_nN_2CO.N_3$, wherein $n$ represents one of the integers 15 and 17, until the evolution of nitrogen and carbon dioxide has ceased.

2. A process for the manufacture of 6-methyl-8-amino-ergolene, which comprises the step of boiling lysergic acid azide in a dilute aqueous solution of hydrochloric acid until the evolution of nitrogen and carbon dioxide has ceased.

3. A process for the manufacture of 6-methyl-8-amino-isoergolene, which comprises the step of boiling isolysergic acid azide in a dilute aqueous solution of sulfuric acid until the evolution of nitrogen and carbon dioxide has ceased.

4. A process for the manufacture of 6-methyl-8-amino-ergoline, which comprises the step of boiling dihydrolysergic acid azide in a dilute aqueous solution of hydrochloric acid until the evolution of nitrogen and carbon dioxide has ceased.

5. The optically active amines containing a ring system selected from the group consisting of lysergic acid and dihydrolysergic acid, and the isomers thereof, corresponding to the general formula $C_{15}H_nN_2NH_2$, $n$ representing, in the general formula one of the integers 15 and 17, which amines are diacidic, salt-forming bases giving Keller's blue color reaction and which are therapeutically useful compounds.

6. The 6-methyl-8-aminoergolene of the formula $C_{15}H_{17}N_3$ which is a crystalline compound melting with decomposition at 252–253° C., having an optical rotation of $[\alpha]_D^{20} = +96°$ (pyridine) and giving Keller's blue color reaction.

7. The 6-methyl-8-amino-isoergolene of the formula $C_{15}H_{17}N_3$ which is a crystalline compound melting with decomposition at 198° C., having an optical rotation of $[\alpha]_D^{20} = +249°$ (pyridine) and giving Keller's blue color reaction.

8. The 6-methyl-8-aminoergoline of the formula $C_{15}H_{19}N_3$ which is a crystalline compound melting with decomposition at 243° C. having an optical rotation of $[\alpha]_D^{20} = -117°$ (pyridine) and giving Keller's blue color reaction.

ARTHUR STOLL.
ALBERT HOFMANN.
FRANZ TROXLER.

REFERENCES CITED

The following references are of record in the file of this patent:

UNITED STATES PATENTS

| Number | Name | Date |
|---|---|---|
| 2,090,430 | Stoll et al. | Aug. 17, 1937 |
| 2,265,217 | Stoll et al. | Dec. 9, 1941 |

OTHER REFERENCES

Sidgwick, "Organic Chemistry of Nitrogen" (Oxford Univ. Press, 1937), pp. 374–376.

Stoll et al., Helv. Chim. Acta, vol. 26, pp. 2070–2081 (1943).

Hofmann, Helv. Chim. Acta, vol. 30, pp. 44–51 (February 1947).